US007792784B2

(12) United States Patent
Gupta

(10) Patent No.: US 7,792,784 B2
(45) Date of Patent: Sep. 7, 2010

(54) STREAMING MULTIDIMENSIONAL DATA BY BYPASSING MULTIDIMENSIONAL QUERY PROCESSOR

(75) Inventor: Sanjeev Kumar Gupta, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/765,277

(22) Filed: Jun. 19, 2007

(65) Prior Publication Data

US 2008/0301086 A1 Dec. 4, 2008

Related U.S. Application Data

(60) Provisional application No. 60/941,166, filed on May 31, 2007.

(51) Int. Cl.
*G06F 7/00* (2006.01)
*G06F 17/00* (2006.01)

(52) U.S. Cl. .................. 707/602; 707/606; 707/610; 707/957; 707/E17.056

(58) Field of Classification Search .................. 707/2
See application file for complete search history.

(56) References Cited

U.S. PATENT DOCUMENTS

| 6,112,198 | A | 8/2000 | Lohman et al. |
| 6,208,990 | B1 | 3/2001 | Suresh et al. |
| 6,272,502 | B1 | 8/2001 | Lieuwen et al. |
| 6,289,335 | B1 | 9/2001 | Downing et al. |
| 6,292,803 | B1 | 9/2001 | Richardson et al. |
| 6,480,836 | B1 | 11/2002 | Colby et al. |
| 6,480,842 | B1 * | 11/2002 | Agassi et al. .................. 707/4 |
| 6,505,188 | B1 | 1/2003 | Ghazal et al. |
| 6,598,039 | B1 * | 7/2003 | Livowsky .................. 707/3 |
| 6,636,875 | B1 | 10/2003 | Bashant et al. |
| 6,681,230 | B1 | 1/2004 | Blott et al. |
| 6,725,287 | B1 | 4/2004 | Loeb et al. |
| 6,785,673 | B1 | 8/2004 | Fernandez et al. |
| 6,882,977 | B1 | 4/2005 | Miller |
| 7,043,727 | B2 | 5/2006 | Bennett et al. |
| 7,124,204 | B2 | 10/2006 | Givoly et al. |

(Continued)

OTHER PUBLICATIONS

U.S. Appl. No. 10/446,336, filed May 27, 2003 entitled "Method for Providing a Real Time View of Heterogeneous Enterprise Data" by Nesamoney et al.

(Continued)

*Primary Examiner*—Mohammad Ali
*Assistant Examiner*—Kannan Shanmugasundaram
(74) *Attorney, Agent, or Firm*—Shumaker & Sieffert, P.A.

(57) ABSTRACT

A data warehouse comprises a multidimensional data storage area to store multidimensional data and a transactional data storage area to store underlying transactional data from which the multidimensional data is generated. The data warehouse also comprises a multidimensional query processor to provide one or more interfaces to issue a first set of queries conforming to one or more multidimensional query languages to retrieve the multidimensional data from the multidimensional data storage area. Furthermore, the data warehouse comprises a dynamic query engine to provide an additional interface to issue a second set of queries that bypass the interfaces provided by the multidimensional query processor to retrieve the transactional data from the transactional data storage area, wherein the second set of queries do not conform to any of the one or more multidimensional query languages.

24 Claims, 8 Drawing Sheets

U.S. PATENT DOCUMENTS

| | | | |
|---|---|---|---|
| 7,139,844 | B2 | 11/2006 | Smith et al. |
| 7,440,963 | B1 | 10/2008 | Bello et al. |
| 7,448,048 | B1 | 11/2008 | Nesamoney et al. |
| 2002/0060696 | A1 | 5/2002 | Seetharaman et al. |
| 2002/0062237 | A1 | 5/2002 | Matsumoto et al. |
| 2002/0194095 | A1 | 12/2002 | Koren |
| 2003/0018506 | A1 | 1/2003 | McLean et al. |
| 2003/0033179 | A1 | 2/2003 | Katz et al. |
| 2003/0212789 | A1 | 11/2003 | Hamel et al. |
| 2003/0225769 | A1 | 12/2003 | Chkodrov et al. |
| 2003/0225820 | A1 | 12/2003 | Chkodrov et al. |
| 2003/0227479 | A1 | 12/2003 | Mizrahi et al. |
| 2004/0019684 | A1 | 1/2004 | Potter et al. |
| 2004/0030739 | A1 | 2/2004 | Yousefizadeh |
| 2004/0034661 | A1 | 2/2004 | Barron et al. |
| 2004/0128342 | A1 | 7/2004 | Maes et al. |
| 2004/0186860 | A1 | 9/2004 | Lee et al. |
| 2004/0267828 | A1 | 12/2004 | Zwilling et al. |
| 2005/0091180 | A1 | 4/2005 | Peleg et al. |
| 2005/0198614 | A1 | 9/2005 | Mavashev et al. |
| 2005/0278341 | A1* | 12/2005 | Kostadinov et al. ........... 707/10 |
| 2006/0116984 | A1* | 6/2006 | Zurek ............................. 707/3 |
| 2007/0130113 | A1* | 6/2007 | Ting ............................... 707/2 |
| 2008/0043256 | A1* | 2/2008 | Broda et al. .................. 358/1.3 |
| 2008/0101369 | A1* | 5/2008 | Sandoz et al. ............... 370/392 |

OTHER PUBLICATIONS

U.S. Appl. No. 10/446,338, filed May 27, 2003 entitled "Method for Performing Real-Time Analytics Using a Business Rules Engine on Real-Time Heterogenous Materialized Data Views" by Nesamoney et al.

U.S. Appl. No. 10/749,317, filed Dec. 31, 2003 entitled "A Method and System for Dynamically Joining Views That Share a Common Key in a Streaming Database System" by Yan et al.

U.S. Appl. No. 10/750,507, filed Dec. 31, 2003 entitled "A Method and System for Dynamically Initializing a View for a Streaming Data Base System" by Yan et al.

Celequest Brochure, "Measuring Business Performance With Operational Dashboards," 6 pages (2005).

Celequest Brochure, "Making Intelligence Active: Measuring Business Performance With Operational Dashboards," 6 pages (2004).

"Celequest Operational Dashboards for IBM Software," 2 pages (2006).

Celequest Brochure, "Lava The Industry's First BI Appliance," 2 pages (2006).

Wikipedia.com entry for Stream Control Transmission Protocol, http://en.wikipedia.org/wiki/SCTP, 6 pages, last printed Oct. 16, 2009.

* cited by examiner

DATA TABLE

| QUERY NO. | DEVICE ID | FIELD NAME | REF FIELD 1 | REF FIELD 2 |
|---|---|---|---|---|
| 1 | 1 | Sales_Revenue | GreaterThan 100 | nil |
| 2 | 1 | Sales_Location | NA | UK |
| 3 | 1 | Sales_Product | Shirt | Blue |
| 4 | 2 | Products_Inventory | NA | Asia |
| 5 | 2 | Products_Price | LessThan 200 | nil |

FIG. 4

STREAMING MULTIDIMENSIONAL DATA BY BYPASSING MULTIDIMENSIONAL QUERY PROCESSOR

This application claims the benefit of U.S. Provisional Application Ser. No. 60/941,166, filed May 31, 2007, the entire content of which is incorporated herein by reference.

TECHNICAL FIELD

The invention relates to enterprise software systems, and more particularly, to issuing queries within enterprise software systems storing multidimensional data.

BACKGROUND

Enterprise software systems are typically sophisticated, large-scale systems that support many, e.g., hundreds or thousands, of concurrent users. Examples of enterprise software systems include enterprise performance management systems, financial planning systems, budget planning systems, order management systems, inventory management systems, sales force management systems, business intelligence tools, enterprise reporting tools, project and resource management systems and other enterprise software systems.

Many enterprise performance management and business planning applications require a large base of users to enter data that the software then accumulates into higher level areas of responsibility in the organization. Moreover, once data has been entered, the data must be retrieved to be utilized. The system performs mathematical calculations on the data, combining data submitted by one user with data submitted by another. Using the results of these calculations, the system generates reports for review by higher management. Often these complex systems make use of multidimensional data sources that organize and manipulate the tremendous volume of data using data structures referred to as data cubes. Each data cube includes a plurality of hierarchical dimensions having levels and members for storing multidimensional data.

One example of a storage facility for multidimensional data is the SAP® Business Information Warehouse ("SAP BW") provided by SAP, Inc. of Walldorf, Germany. SAP BW provides database tools and databases to clients that allow the clients to store, extract, query, and manipulate data. SAP BW stores multidimensional data in data structures known as "InfoCubes." Open Analysis Interfaces are typically used to extract multidimensional data from the InfoCubes. SAP BW supports three Open Analysis Interfaces: the Object Linking and Embedding Database ("OLE DB") for Online Analytic Processing ("OLAP"), the OLAP Business Application Programming Interface ("BAPI"), and the Extensible Markup Language ("XML") for Analysis ("XMLA"). In addition, SAP also provides the Business Explorer ("BEX") interface for querying the OLAP processor of the SAP BW system.

Each of OLE DB, OLAP BAPI, and XMLA generate Multidimensional Expression ("MDX") queries. In general, MDX is a language for querying multidimensional data stored in multidimensional databases. Each query from a user through the Open Analysis Interfaces, likewise, is an MDX query, each of which must be processed by an MDX processor. Similarly, the BEX interface interacts with the OLAP processor to output the results of complex multidimensional queries. Therefore, as the number of concurrent users increases, frequent round-trips of data and the limitations of the SAP BW for handling a high volume of MDX and BEX-OLAP queries presents scalability and performance issues. Similarly, Open Analysis Interfaces and BEX may be somewhat limited with respect to the ability to transfer large quantities of data.

SUMMARY

In general, the invention is directed to techniques that enable real-time streaming of data from a multidimensional data warehouses. As described herein, streaming of data from a complex, enterprise multidimensional data warehouse may be accomplished without necessarily issuing multidimensional queries directly to the data warehouse. As one example, real-time streaming of data from an SAP BW may be accomplished without the use of Open Analysis Interfaces or the Business Explorer ("BEX") that typically utilize complex queries in conformance with a multidimensional query language and extract voluminous amounts of multidimensional data.

As described herein, a dashboard appliance receives a stream of events from the data warehouse and presents "dashboards" to enterprise users. The "dashboards" graphically illustrate current enterprise activity and provide an up-to-date view of the enterprise data. The stream of events received and processed by the dashboard appliance represents changes or updates to the multidimensional data maintained by one or more data warehouses.

A dynamic query engine operates within each data warehouse to provide a continual stream of enterprise events to the dashboard appliance. As described herein, the dynamic query engine provides an execution framework for execution of low-level queries that bypass any multidimensional interfaces provided by the data warehouse. The low-level queries may be queries which do not conform to any multidimensional querying language. In one embodiment, for example, the dynamic query engine allows devices, such as the dashboard device, to define SQL-based queries that are used to extract incremental differences made to the multidimensional data warehouse. Once established, the dashboard device received an unlimited stream of raw data "over the wire" by way of a network communication or a file transfer.

In accordance with the techniques described herein, the dashboard device may interact with the dynamic query engine to define queries that bypass any multidimensional interfaces presented by the data warehouse, receive the raw data from the data warehouse in the form a stream of events, and reassemble the raw data into one or more local multidimensional data cubes within the dashboard device. The dashboard device may then utilize the local data cubes to update dashboard views presented to the user, rather than issuing complex multidimensional queries to the data warehouse directly. To maintain the streaming of raw data from the multidimensional data warehouse, the device may refresh of the local data cube as the raw data stored in the data warehouse is updated, gathering only incremental updates to the data by interaction with the dynamic query engine.

As described herein, there may be two phases to raw data extraction from a data warehouse. First, the dashboard device may perform metadata extraction. The dashboard device may extract metadata from the data warehouse regarding both the organization of the multidimensional data within the warehouse and the underlying transactional data on which the multidimensional data is based. The dashboard device may use the metadata to create a storage schema for locally storing the raw data such that the local schema may resemble all or portions of the storage schema used for the multidimensional data structures of the data warehouse. The dashboard device may also use the metadata to formulate SQL-based database queries for extracting the raw data directly from a transactional data are of the data warehouse. Moreover, the dashboard device may use the metadata, as well as user requirements, to narrow the amount of raw data to be extracted from the warehouse. After extracting and processing the metadata to generate data queries, the dashboard device engages the dynamic query engine installed with in the data warehouse to specify the SQL-based data queries.

Once the queries are defined and installed, the dashboard device invokes the queries to receive a stream of events representing incremental updates to the raw data from the transactional area of the data warehouse. The dashboard devices stores this extracted data in the one or more local data cubes and utilizes the local data cube for presenting the dashboards to the users. For example, after the first data extraction, the data warehouse may send a network communication to the dashboard device in response to a transaction event. The communication triggers the dashboard device to perform extraction of the new, updated data by invocation of the defined queries. After each data extraction, the dashboard device may update the dashboards presented to the users.

In one embodiment, the invention is directed to a data warehouse which comprises a multidimensional data storage area to store multidimensional data and a transactional data storage area to store underlying transactional data from which the multidimensional data is generated. The data warehouse also comprises a multidimensional query processor to provide one or more interfaces to issue a first set of queries conforming to one or more multidimensional query languages to retrieve the multidimensional data from the multidimensional data storage area. Furthermore, the data warehouse comprises a dynamic query engine to provide an additional interface to issue a second set of queries that bypass the interfaces provided by the multidimensional query processor to retrieve the transactional data from the transactional data storage area, wherein the second set of queries do not conform to any of the one or more multidimensional query languages.

In another embodiment, the invention is directed to a method comprising installing a dynamic query engine on a data warehouse, wherein the data warehouse includes transactional data in a transactional data storage area and multidimensional data generated from the transactional data in a multidimensional data storage area, and further wherein the data warehouse includes one or more interfaces for issuing a first set of queries conforming to the one or more multidimensional query languages to query the multidimensional data. The method further comprises providing, with the dynamic query engine, an additional interface that issues a second set of queries that bypass the interfaces provided by the multidimensional query processor, wherein the second set of queries do not conform to any of the one or more multidimensional query languages. Moreover, the method comprises retrieving, with the additional interface of the dynamic query engine, the transactional data from the transactional data storage area according to the second set of queries. The method also comprises streaming the retrieved transactional data on a network In another embodiment, the invention is directed to a system comprising a data warehouse and a network device. The data warehouse comprises a multidimensional data storage area to store multidimensional data, a transactional data storage area to store underlying transactional data from which the multidimensional data is generated, and a multidimensional query processor to provide one or more interfaces to issue a first set of queries conforming to one or more multidimensional query languages to retrieve the multidimensional data from the multidimensional data storage area. The data warehouse further comprises a dynamic query engine to provide an additional interface to issue a second set of queries that bypass the interfaces provided by the multidimensional query processor to retrieve the transactional data from the transactional data storage area and metadata from the transactional data storage area and metadata from the multidimensional data storage area, wherein the second set of queries do not conform to any of the one or more multidimensional query languages. The network device comprises a streaming database having a local multidimensional data storage area, a metadata driver to receive metadata from the dynamic query engine of the data warehouse, and a data driver to create a storage schema in the local multidimensional data storage area according to the metadata received from the dynamic query engine, to generate the second set of queries for the dynamic query engine, to receive transactional data from the dynamic query engine, and to store the received transactional data in the local multidimensional storage area according to the storage schema.

In yet another embodiment, the invention is directed to a computer-readable medium containing instructions. The instructions cause a programmable processor to receive, from a dashboard device, a unique identifier and a set of queries, wherein the queries do not conform to a multidimensional data query language. The instructions also cause the programmable processor to store the unique identifier and the set of queries in a data table, retrieve metadata from a transactional data storage area of a data warehouse, retrieve metadata from a multidimensional data storage area of a data warehouse. Moreover, the instructions cause the programmable processor to transmit the metadata from the transactional data storage area and the metadata from the multidimensional data storage area to the dashboard device using a chunking protocol operating at an application layer (layer seven) of the Open Systems Interconnection ("OSI") networking model and to retrieve transactional data from the transactional data storage area of the data warehouse, and to transmit the retrieved transactional data to the dashboard device using the chunking protocol.

The techniques described herein may provide several advantages. Streaming data is, generally, presenting data and changes to the data to a user over time. The user may observe changes to the data in real time. Changes to the data may occur upon business events, also referred to herein as transaction events, such as, for example, issuing a purchase order, replenishing supplies, issuing a forecast or posting an expense item. Data warehouses are typically designed to present a user with the results of a query on demand, rather than to stream data. The techniques described herein may enable streaming the data resulting from multidimensional queries and analysis.

As another example, the techniques may reduce the burden carried by the data warehouse. As such, a greater number of users may be able to query the same data. Accordingly, users may have the ability to quickly receive the results of a query. Moreover, the techniques described herein may permit streaming a potentially infinite quantity of data to the remote server.

Although described with respect to dashboard devices, the techniques may be employed on other types of devices that maintain streaming databases and reassemble raw data in multidimensional form for presentment to users.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a block diagram illustrating an example embodiment of a data table of a dynamic query engine.

DETAILED DESCRIPTION

Figure 1:
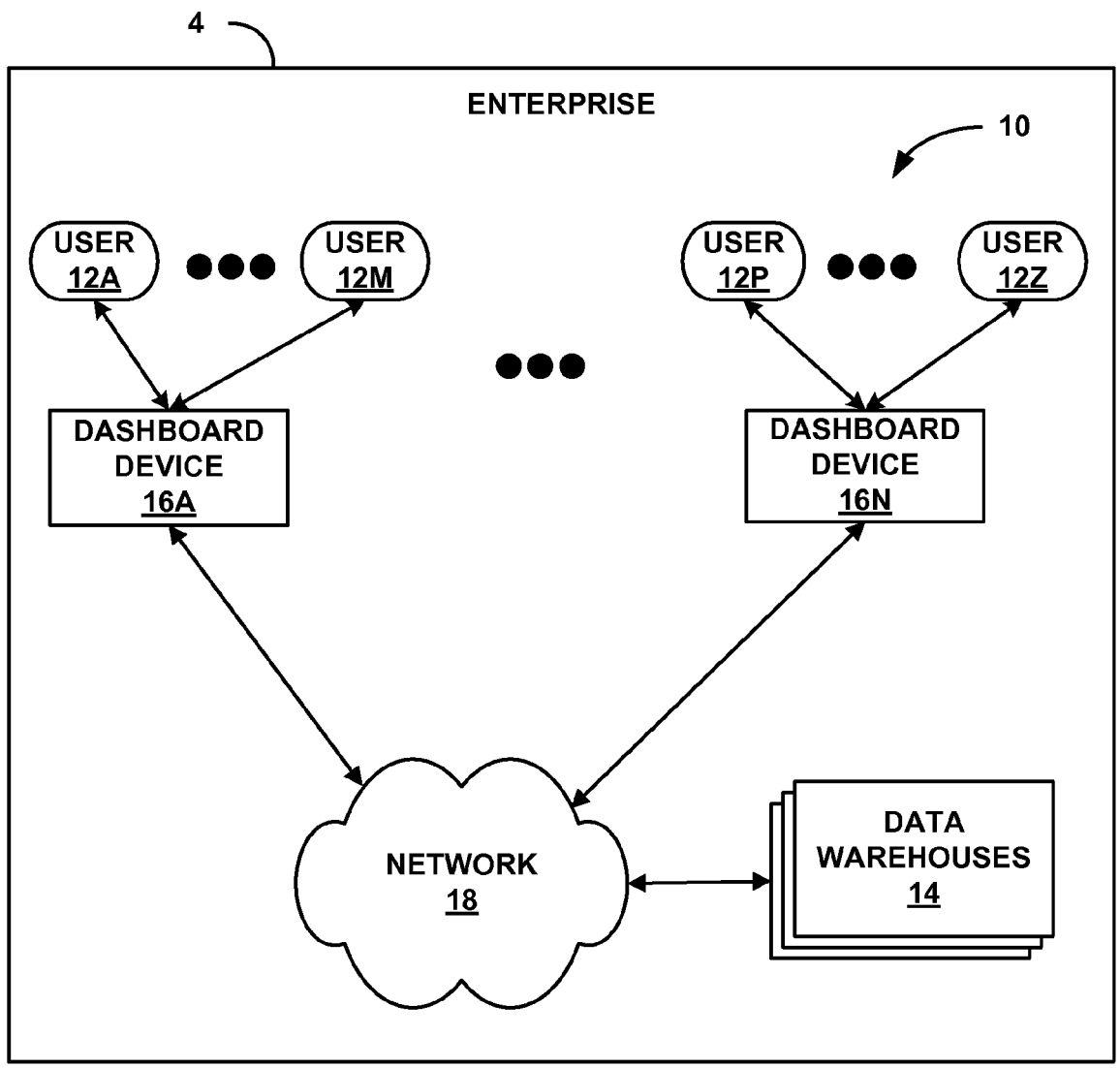
FIG. 1 is a block illustrating an example enterprise having a computing environment in which a plurality of devices interact with a data warehouse.

FIG. 1 is a block illustrating an example enterprise 4 having a computing environment 10 in which a plurality of dashboard devices 16A-16N ("dashboard devices 16") interact with one or more data warehouses 14. In the system shown in FIG. 1, data warehouses 14 are communicatively coupled to a number of dashboard devices 16 through network 18. Each of dashboard devices 16 may permit access to a plurality of users 12A-12Z ("users 12"). Dashboard devices 16 interact with data warehouses 14 to establish a continuous stream of data and data changes from data warehouses 14. Dashboard devices 16 provide "dashboards" or views to users 12 that show current activity with respect to the enterprise data stored within data warehouses 14. The views graphically illustrate the enterprise data and real-time changes to the data. Users 12 may request particular views, such as sales by location, from dashboard devices 16. Dashboard devices 16 may create the views in response to requests from users 12 by defining queries for a query engine within data warehouses 14.

Enterprise users 12 may utilize a variety of computing devices or dashboard devices to interact with data warehouse 14 via network 18. For example, an enterprise user may interact with data warehouse 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device. A computing device may include a dashboard device.

Network 18 represents any communication network, such as a packet-based digital network like a private corporate network or a public network like the Internet. In this manner, computing environment 10 can readily scale to suit large enterprises. Enterprise users 12 may directly access data warehouse 14 via a local area network, or may remotely access data warehouse 14 via a virtual private network, remote dial-up, or similar remote access communication mechanism.

A transaction event may update the data stored on data warehouses 14. A transaction event may be, for example, a sale of a product or the reception of a shipment of products. In response to a transaction event, such as a sale, a new transaction may be entered into data warehouses 14 which may include, for example, elements such as the date, product name, product description, point of sale, price, and net profit. The change in the data is manifested in the stream of data from data warehouses 14 to dashboard devices 16. In turn, dashboard devices 16 update the views presented to users 12 with respect to the changes to the data caused by transaction events.

For exemplary purposes, the invention is described in reference to dashboard devices 12 and data warehouses 14 associated with large-scale enterprise business intelligence systems, enterprise financial or performance management systems. The techniques described herein may be readily applied to dashboard devices and data warehouses associated with other software systems, including other large-scale enterprise software systems. Examples of enterprise software systems include order management systems, inventory management systems, sales force management systems, business intelligent tools, enterprise reporting tools, project and resource management systems and other enterprise software systems. The techniques described herein may also be applied to smaller scale business intelligence software and software systems.

Dashboard devices 16 may provide users 12 access to streaming data to view events in real time. For example, dashboard devices 16 may provide users 12 with a real time stream of data such as sales by region or sales by product and country. Other examples of possible information may include early-warning indicators of problems with specific products or services, performance indicators, and risk indicators. Moreover, such data can be streamed to users 12 in real time. That is, after a transaction event occurs, such as a sale, the data may be updated, and dashboard devices 16 may retrieve the updated data to update, in real time, the views provided to users 12. The data is "multidimensional" in that each multidimensional data element is defined by a plurality of different object types, where each object is associated with a different dimension. In addition, users 12 may manipulate the data retrieved by dashboard devices 16 in order to retrieve additional details about the data.

As an example, user 12A may use dashboard device 16A to make business decisions in the banking industry. User 12A may be a bank manager of a bank fixed income division, who may need to make business decisions regarding a bond portfolio to maximize profits for the fixed income division. Such bank managers face the need, typical of most business people, for obtaining real time access to key transaction events. That is, business people may need to be able to monitor certain business metrics in real time, such as inventory levels, demand forecast, number of returns of a particular product, defect rates of a particular product, risk attributes, and warning attributes. For example, the bank managers may need to monitor, for a bond portfolio, the rating of each bond, the yield of each bond, priorities of the division, and risk profiles of the portfolio. Each of these metrics may change rapidly. By utilizing the techniques described herein, which incorporate streaming data, the managers may monitor these metrics on the fly, rather than repeatedly generating queries for retrieving all updates to the data.

Streaming data in real time from data warehouses 14 to dashboard devices 16 may provide certain advantages. For example, a large number of users 12 may be able to view dashboards on dashboard devices 16 representing data stored on data warehouses 14. Users 12 may have the ability to quickly receive the results of a query by querying data streamed to and stored on dashboard devices 16 rather than querying data warehouses 14 directly. Moreover, the techniques described herein may enable data warehouses 14 to stream a potentially infinite quantity of data to dashboard devices 16.

Although described with respect to dashboard devices, the techniques may be employed on other types of devices that maintain streaming databases and reassemble raw data in multidimensional form for presentment to users.

Figure 2:
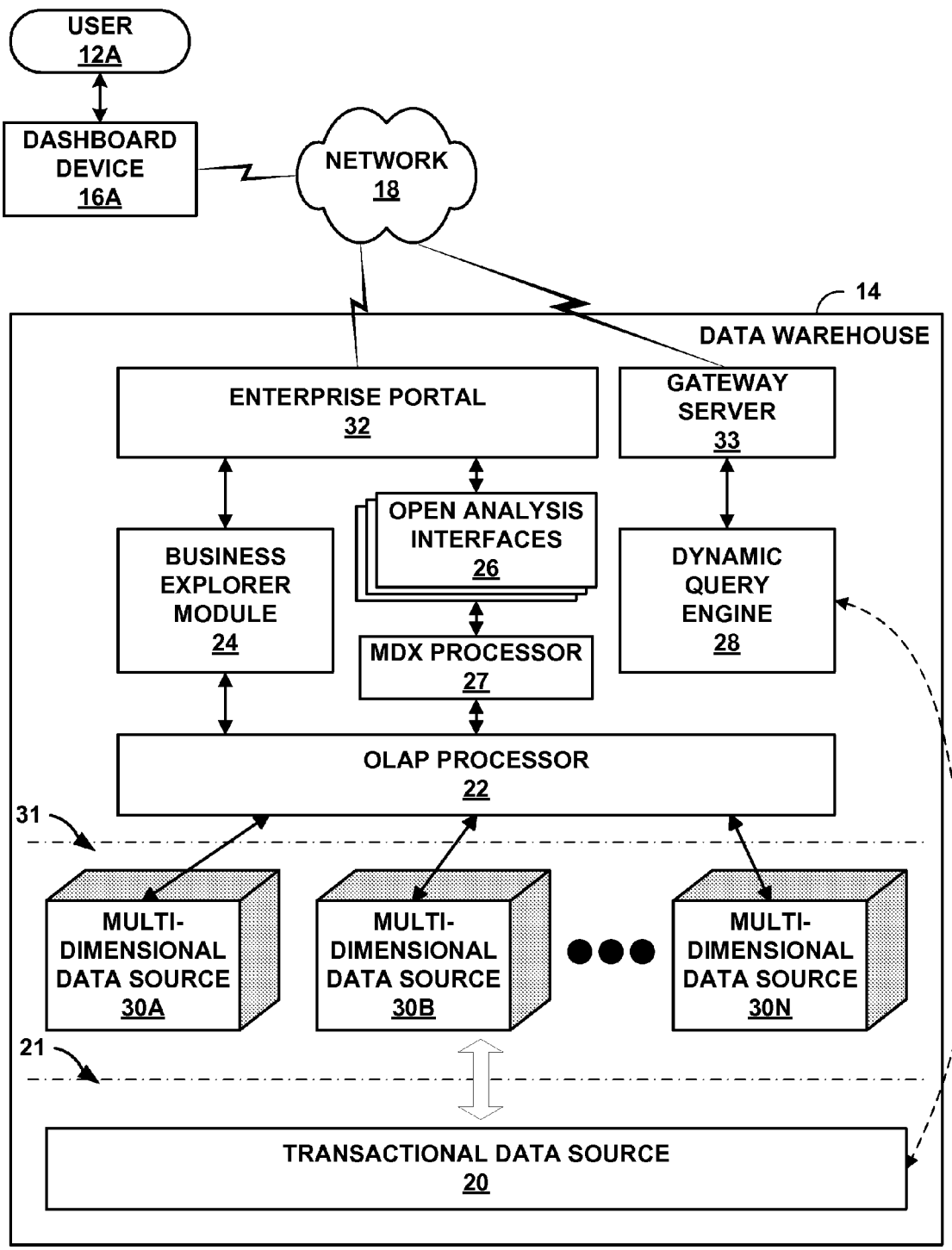
FIG. 2 is a block diagram illustrating an example embodiment of a data warehouse.

FIG. 2 is a block diagram illustrating an example embodiment of one of data warehouses 14. In the exemplary embodiment, data warehouse 14 comprises enterprise portal 32, business explorer 24, Open Analysis Interfaces 26, Online Analytic Processing ("OLAP") processor 22, multidimensional data sources 30A-30N ("multidimensional data sources 30"), gateway server 33, dynamic query engine 28, and transactional data 20.

Transactional data storage area 21 of data warehouse 14 stores transactional data, while multidimensional data storage area 31 of data warehouse 14 stores multidimensional data. Data warehouses 14 may generate multidimensional data stored in multidimensional data storage area 31 as a function of the transactional data of transactional data storage area 21. Areas 21 and 31 may exist as any arrangement of data storage. For example, areas 21 and 31 may exist concurrently with the other components of data warehouse 14 as a single entity. As another example, areas 21 and 31 may exist as distinct database servers. As yet another example, each of areas 21 and 31 may exist on multiple database servers. In one embodiment, data warehouse 14 may be the SAP Business Information Warehouse ("SAP BW").

Transactional data 20 may be raw data collected in a standard database. In general, transactional data is data collected in response to a transaction event. For example, a transaction event may be the sale of one product. The transactional data from such a sale may include, furthering the example, the date of the sale, the name of the product, the description of the product, the point of origin, the place of sale, a description of the customer, the name of the salesperson, the price of the product, and the net profit from the sale. Upon a new sale, a new entry may be recorded in transactional data 20, potentially including an entry for each dimension. For a large corporation, organizing such data into a sensible representation may be time consuming. Moreover, while a local manager may perceive the name of the salesperson as a high priority, in order to award promotions or coordinate training, the corporate CFO might prioritize net profit by region over all else. Rather than viewing raw transactional data, therefore, users 12 may instead manipulate multidimensional data stored in multidimensional data sources 30.

Multidimensional data sources 30 may represent transactional data 20 in a more useful way. Multidimensional data sources 30 may be multidimensional data "cubes," which may comprise more than three dimensions. In one embodiment, multidimensional data sources 30 may be arranged in a snowflake schema. In accordance with the above example, a data cube may have a dimension for each of time, product, net profit, price, and place of sale, thus requiring at least five dimensions. Data warehouse 14 may convert transactional data 20 into multidimensional data and store the multidimensional data in multidimensional data sources 30. Furthermore, when transactional data 20 is updated, data warehouse 14 may update multidimensional data sources 30 accordingly. Transactional data 20 may be updated, for example, in response to a request from one of users 12 or in response to an outside triggering event from another source (not shown) such as a transaction event. For example, a cash register may be communicatively coupled to data warehouse 14 via network 18 and send a communication upon the conclusion of a sale of a product. In response, data warehouse 14 may update transactional data 20 and likewise multidimensional data sources 30 accordingly.

Two primary methods for querying data stored in data warehouse 14 are currently used in accordance with the known art. The first is a tool provided by SAP, the Business Explorer ("BEX"), which FIG. 2 depicts as business explorer module ("BEX module") 24. BEX module 24 works directly with OLAP processor 22 of SAP BW to query multidimensional data sources 30. BEX is capable of handling a limited number of users, and corresponding queries, at a given time. The second method is to utilize Open Analysis Interfaces 26, which may generate and issue Multidimensional Expression ("MDX") queries to MDX processor 27, which may translate MDX queries into OLAP queries for OLAP processor 22. Examples of Open Analysis Interfaces are the Object Linking and Embedding Database ("OLE DB") for OLAP, the OLAP Business Application Programming Interface ("BAPI"), and the Extensible Markup Language ("XML") for Analysis ("XMLA"). MDX is designed for on demand querying and is not designed to support streaming of multidimensional data. As each of the Open Analysis Interfaces utilize the same MDX processor, there tends to be very little difference in performance between the Open Analysis Interfaces, other than the complexity of the MDX queries generated.

A third method may be implemented in accordance with the techniques as described in greater detail below. In general, this method permits bypassing the querying of multidimensional data sources 30, that is, bypassing either or both of MDX processor 27 and OLAP processor 22, by extracting some or all of transactional data 20 and organizing the transactional data into a data cube on a local server, for example, one of dashboard devices 16. Dashboard devices 16 may communicate with gateway server 33 in order to access dynamic query engine 28.

Dashboard devices 16 may, generally, retrieve the metadata and raw data stored on data warehouses 14 in order to create a local multidimensional data cube. Dashboard devices 16 interact with dynamic query engine 28 to install queries to produce a continuous stream of data that represents the incremental changes made to transactional data source 20. Dynamic query engine 28 produces the data stream "on the wire," that is, over a high-bandwidth network link to dashboard devices 16. Dashboard devices 16 capture the retrieved multidimensional data and reassemble the data locally in multidimensional form, such as in a data cube structure. Dashboard devices 16 may then issue multidimensional queries to the local data cube to update the dashboard views provided to users 12.

This method may provide several advantages. For example, the method may permit streaming of data as transactional data 20 is updated by using a query to update the data cube on the remote server in response to the update of transactional data 20. Another advantage may be that avoiding the use of MDX queries may avoid delays that may occur when a high volume of users 12 issue a high volume of MDX queries. Moreover, the method may permit dynamic response to changes to transactional data 20 or multidimensional data sources 30.

Another possible advantage may be the reduction of time to receive the result of a query, as the dashboard device that stores the data, for example, dashboard device 16A, may only retrieve a subset of the data stored in transactional data 20. Thus the data cube stored on dashboard device 16A may be smaller and a query from one of users 12 need not necessarily traverse all of the data stored on multidimensional data sources 30 to return a result. For example, user 12A, operating dashboard device 16A, may only be interested in data for the current year. Accordingly, in creating the data cube, dashboard device 16A may only need to extract data from transactional data 20 corresponding to the current year.

Figure 3:
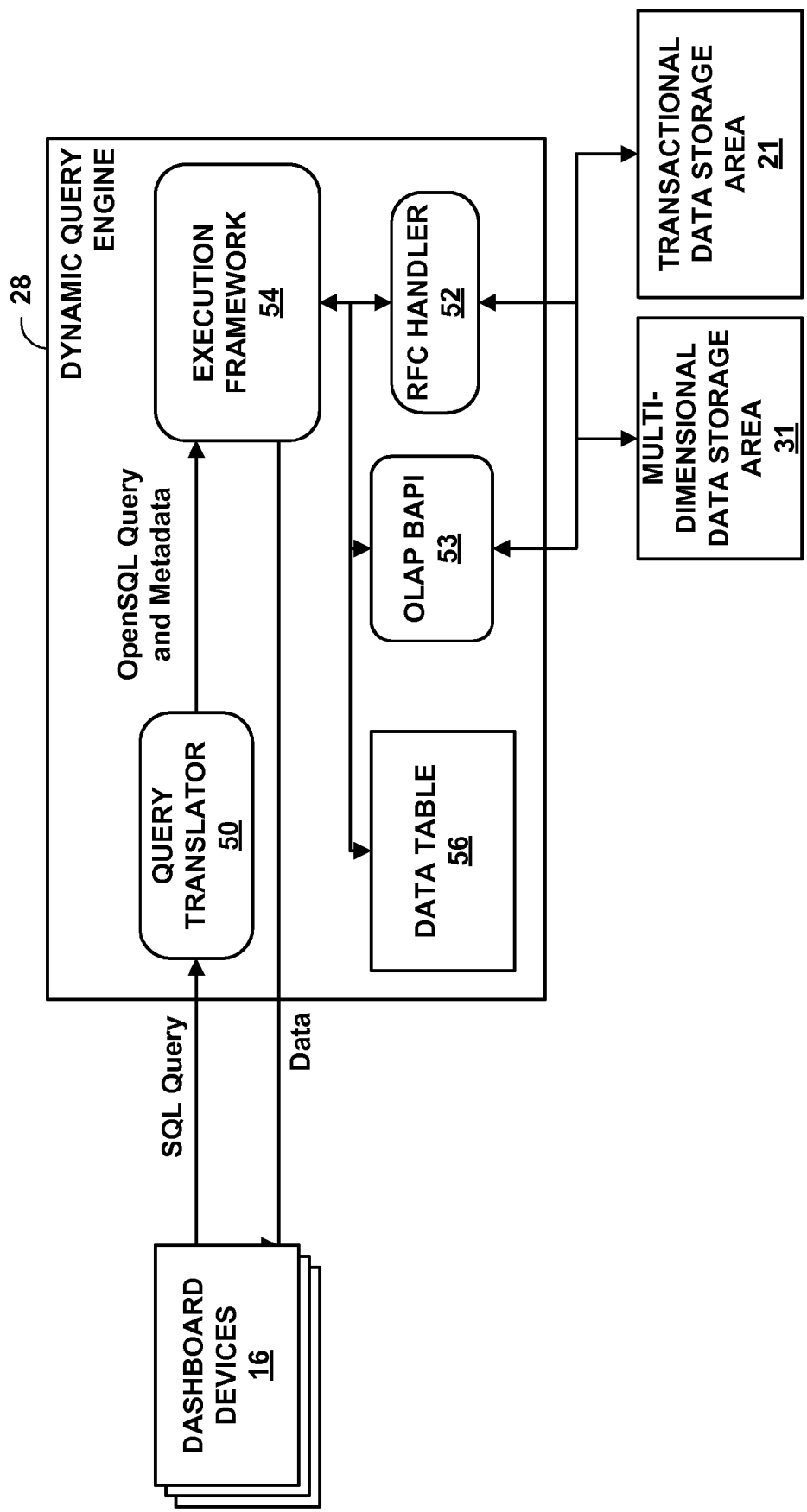
FIG. 3 is a block diagram illustrating an example embodiment of a dynamic query engine.

FIG. 3 is a block diagram illustrating an example embodiment of dynamic query engine 28. In general, dynamic query engine 28 is responsible for receiving queries from dashboard devices, for example, dashboard device 16A, querying metadata and transactional data, and returning the results of the queries to the respective dashboard device, in this case, dashboard device 16A. In one embodiment, dynamic query engine 28 may be software which may be installed on data warehouses 14, such as SAP BWs. In the exemplary embodiment, dynamic query engine 28 may utilize Structured Query Language ("SQL") queries and OpenSQL queries. However, those skilled in the art will appreciate that similar querying languages for querying transactional data can substitute for SQL and OpenSQL. That is, one may substitute querying languages that avoid the use of complex multidimensional queries used by MDX processor 27 and OLAP processor 22. In the exemplary embodiment, dynamic query engine 28 includes execution framework 54, query translator 50, remote function call ("RFC") handler 52, and data table 56.

Query translator 50 receives SQL queries from dashboard devices 16. Query translator 50 may translate these SQL queries into OpenSQL queries. An OpenSQL query includes three clauses: a SELECT clause, a FROM clause, and a WHERE clause. The SELECT clause defines the column list or the result set to return to the client. The SELECT clause can be parsed into a list of tuples, each tuple including a table name, a column name, and an alias table name. During execution, dynamic query engine 28 may replace the alias table name with the actual table name. The FROM clause defines the relationship between various underlying tables of a multidimensional data source or a transactional data source object, as well as how to join the various tables when applying a filter. The WHERE clause includes zero or more filters that may be applied just before returning the result set, which may reduce the resulting dataset. Thus dashboard devices 16 may avoid the use of complex multidimensional querying languages, such as MDX, designed to interact with multidimensional interfaces typically presented by data warehouses 14.

Execution framework 54 may execute the translated queries from query translator 50. The translated queries from query translator 50 may be persistent queries, installed on execution framework 54, that are designed to capture changes to transactional data source 20. In one embodiment, execution framework 54 may store the translated queries in data table 56 that associates particular queries with the requesting dashboard device, for example, dashboard device 16A. Data table 56 is discussed in greater detail with respect to FIG. 4. Execution framework 54 may periodically reissue the installed queries and return the results to requesting dashboard devices 16 accordingly. In one embodiment, execution framework 54 may transmit the results "on the wire." That is, execution framework 54 may transmit the results of the queries over a network link to dashboard devices 16. In one embodiment, execution framework 54 transmits the results of the queries via the transmission control protocol/internet protocol ("TCP/IP"). In another embodiment, execution framework 54 may transmit the results using a flat file. In yet another embodiment, execution framework 54 may transmit the results either by TCP/IP or by flat file, permitting dashboard devices 16 to select the appropriate delivery method. This may permit execution framework 54 to transmit an unlimited quantity of data in a streaming fashion. Execution framework 54 may execute the translated queries in the background in order to avoid time delays associated with executing queries in the foreground. That is, execution framework 54 may execute the stored queries using a simple querying language, such as SQL, while avoiding the complex multidimensional query processing engines provided by data warehouses 14 such as OLAP and MDX.

To execute the translated queries and extract data from data warehouses 14, execution framework 54 may utilize RFC handler 52. RFC handler 52 calls RFCs, i.e., functions implemented on data warehouses 14. In one embodiment, data warehouses 14 are SAP BWs, and RFC handler 52 may be designed in accordance with the SAP-provided library of RFCs which enable, for example, querying of data and data extraction. RFC handler 52 interprets the translated queries from execution framework 54 and utilizes the proper RFCs to execute the queries. Execution framework 54 may also utilize an Online Analytic Processing Business Application Programming Interface 53 ("OLAP BAPI 53") in order to extract metadata and data from multidimensional data sources 30.

Execution framework 54 may also utilize metadata during query execution. Execution framework 54 may store metadata in a column of data table 56 or may receive the metadata from dashboard devices 16. Execution framework 54 may use the metadata during execution of the queries to gather information about, for example, the tuples in a SELECT clause of an OpenSQL query. Execution framework 54 also sends the results of queries to dashboard devices 16. Prior to query execution, the dashboard device, for example, dashboard device 16A, generates a unique identifier for itself which is sent to dynamic query engine 28. Execution framework 54 may use the identifier to send the result to the proper dashboard device. Execution framework 54 may transmit data using a chunking protocol. That is, execution framework 54 may break data into "chunks" and may send the chunks of data in series to, for example, dashboard device 16A, from which dynamic query engine 28 received a query. A chunking protocol may operate at the application layer, or layer seven, of the Open Systems Interconnection ("OSI") networking model. Thus although to effect network transmission, data may be segmented into packets during transmission at lower levels, the chunking protocol may segment data into chunks before network transmission begins.

Execution framework 54 may be able to execute any query of the supported query language. For example, in one embodiment, dynamic query engine 28 is installed on an SAP BW server and execution framework 54 is capable of executing any OpenSQL query. Therefore, dynamic query engine 28 is not limited to a strict set of hard-coded or static queries but is capable of executing a wide range of complex queries.

Execution framework 54 may also maintain a plurality of connections with dashboard devices 16. For example, execution framework 54 may maintain connections with each of dashboard devices 16A-16N. In one embodiment, these connections may be TCP/IP connections.

FIG. 4 is a block diagram illustrating an example embodiment of data table 56 maintained by dynamic query engine 28. Data table 56 may include entries for each of the queries from one or more of dashboard devices 16. That is, data table 56 may include a column to store identifiers of dashboard devices 16, a column to store the field name of the transactional data field to which the query is directed, and one or more columns to store the details of the query, such as what data is to be extracted from the field. In one embodiment, entries in the field name may identify both a target table and a target field of that table. For example, an entry in the field name column may be "Sales_Cost" wherein "sales" refers to the table "sales" and "cost" refers to the "cost" field within the "sales" table.

Dashboard devices 16 may each create a unique identifier and send the unique identifier to dynamic query engine 28. Data table 56 may use the identifiers to associate queries with each particular dashboard device. For example, dashboard device 16A may create a unique identifier and send that unique identifier to dynamic query engine 28 along with each of the queries dashboard device 16A sends to dynamic query engine 28. Dynamic query engine 28 may create a new entry in data table 56 for the queries received from each of dashboard devices 16. This may be necessary as each of dashboard devices 16 may support a plurality of users 12, each of whom may request views which require different data sets. Dynamic query engine 28 may use the identifiers to transmit the results of the query to the proper destination, for example, dashboard device 16A.

In the example embodiment, data table 56 includes a key column, a dashboard identifier column, a field name column, and two reference columns. The key column is used to uniquely identify each query entry. The dashboard identifier column stores the identifier associated with the requesting dashboard device, for example, dashboard device 16A. The field name column stores the table and field name of the table from which to extract data. The reference columns may be used to narrow the data set returned to the requesting dashboard device.

In one embodiment, data table 56 stores data corresponding to an SQL query. That is, the field name column may store entries corresponding to the SELECT and FROM clauses of an SQL query, while the reference fields may store entries corresponding to the WHERE clause of the SQL query.

Figure 5:
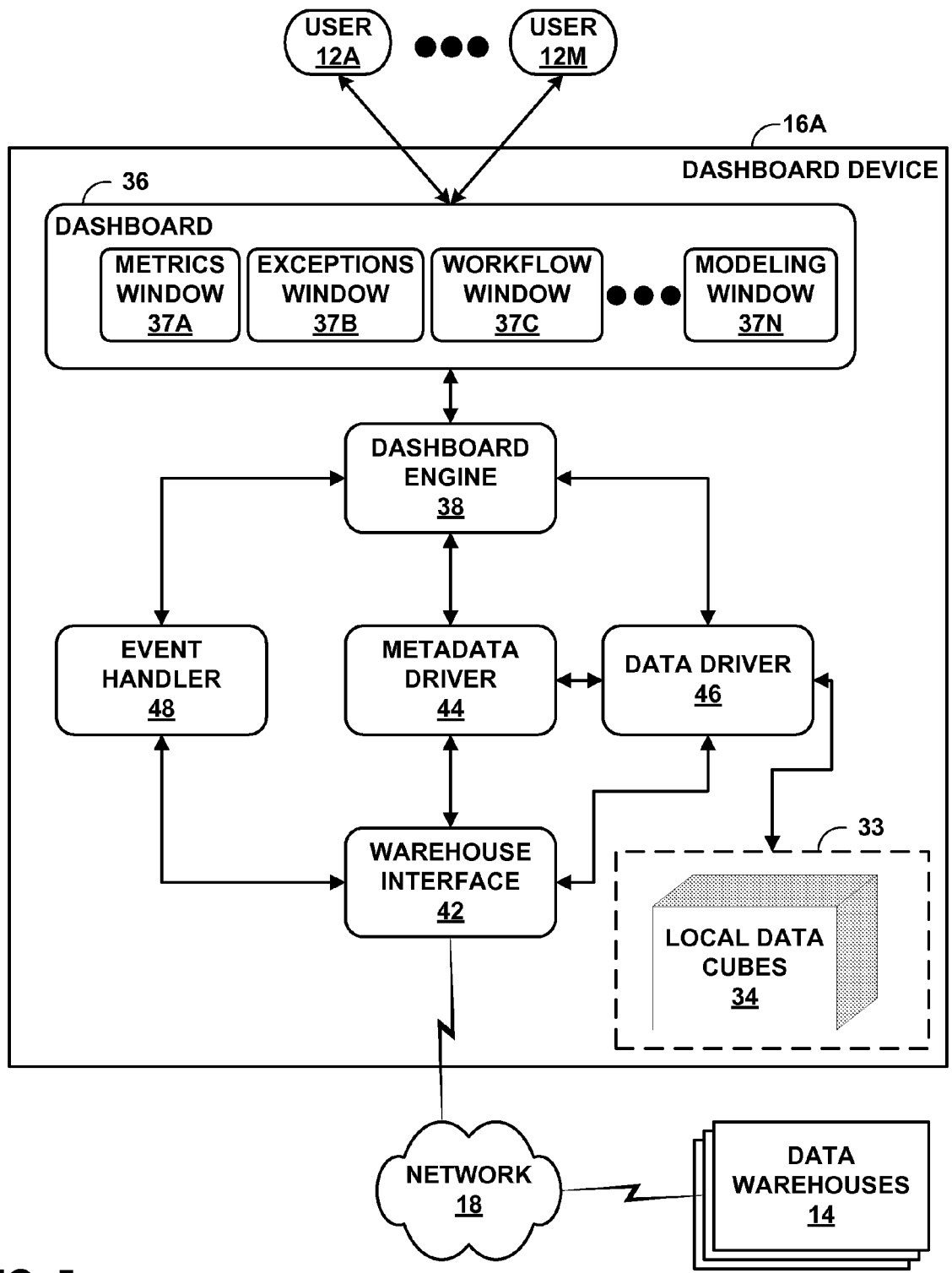
FIG. 5 is a block diagram illustrating an example embodiment of a dashboard device.
Figure 6:
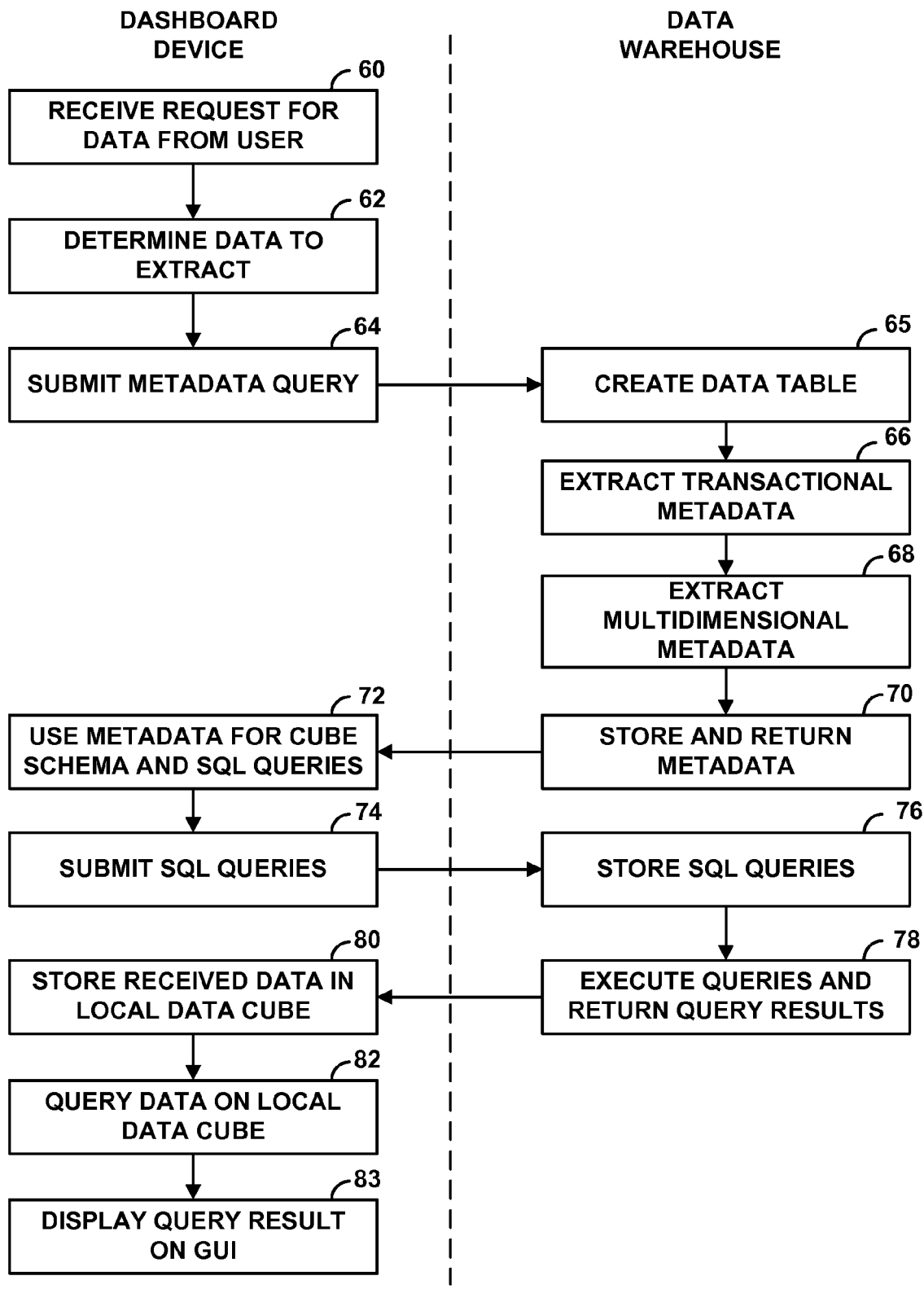
FIG. 6 is a flowchart illustrating an example sequence of events for initiating a stream of multidimensional data.

FIG. 5 is a block diagram illustrating an example embodiment of dashboard device 16A. In the exemplary embodiment, dashboard device 16A includes dashboard 36, dashboard engine 38, query generator 40, warehouse interface 42, and multidimensional storage area 33, which may include one or more local data cubes 34. Dashboard 36 presents query options and reports to users 12A-12M. FIG. 6 illustrates an exemplary dashboard such as dashboard 36, a type of graphical user interface ("GUI"), in further detail. Generally, dashboard 36 permits users 12 to interact with data stored in data warehouses 14. For example, dashboard 36 displays options for users to retrieve data as well as displaying the results of retrieved data. Dashboard 36 reflects changes to the data in the various views 37 in real time. Dashboard 36 also communicates with dashboard engine 38 to signal dashboard engine 38 as to what data is needed for each reports. Dashboard engine 38 receives the requests and sends the proper queries to local data cube 34 to generate the requested report data. Dashboard 36, in turn, may display graphical representations of the data. For example, dashboard 36 may display sales by region, trade volume, risk indicators, or other similar reports.

In the exemplary embodiment, dashboard 36 includes views 37A-37N ("views 37"). Views 37 provide an interface between users 12 and data warehouses 14. Users 12 may request a plurality of views 37 which display streaming, real time data. Views 37 provide users 12 with mechanisms with which to request data displays and, upon a submission of a data or view request, views 37 displays the requested data. Moreover, dashboard 36 provides users 12 with the ability to "drill down" into the data in greater detail, for example to query multidimensional data 33 and local data cubes 34.

Dashboard engine 38 controls various elements of dashboard device 16A. When dashboard 36 needs to update the display, dashboard engine 38 instructs dashboard 36 as to what needs to change and in what way. Dashboard engine 38 also coordinates between metadata driver 44, data driver 46, and event handler 48.

Metadata driver 44 retrieves metadata from data warehouses 14 using metadata extraction queries. Metadata driver 44 may customize these queries in accordance with requests from users 12 issued through dashboard 36. Upon receiving metadata from data warehouses 14, metadata driver 44 may generate queries for retrieving data corresponding to the metadata. In one example, metadata driver 44 generates SQL queries. Metadata driver 44 may customize the data queries to conform to requests from users 12 as well. Metadata driver 44 may pass the metadata and data queries to data driver 46.

Data driver 46 may utilize metadata from data warehouses 14, passed from metadata driver 44, to create a multidimensional data structure in local data cube 34. In one embodiment, data driver 46 may structure local data cube 34 in accordance with a snowflake schema. Other embodiments may utilize other multidimensional data structures and schemas, such as a star schema. Data driver 46 may also issue the queries generated by metadata driver 44 to data warehouses 14.

Event handler 48 receives notices of events from data warehouses 14. When an event, such as a sale, occurs, transactional data 20 of data warehouses 14 is updated. Accordingly, each local data cube 34 of dashboard devices 16 must also be updated to reflect the event. Event handler 48 responds to an event notification from data warehouses 14. In one embodiment, event handler 48 may inform dashboard engine 38 of any updates which must take place to local data cube 34 and dashboard 36. For example, upon a sale of a product, event handler 48 may inform dashboard engine 38 of the sale and relevant data, such as revenue, product description, and the location of sale. If dashboard 36 is displaying sales reports, dashboard engine 38 may instruct dashboard 36 to update in accordance with the new sale. Moreover, dashboard engine 38 may inform data driver 46 to update local data cube 34 in accordance with the event. In one embodiment, data driver 46 may generate a new query, such as an SQL query, to retrieve the relevant components of the event data. In another embodiment, data warehouses 14, and specifically dynamic query engine 28, may transmit the data as part of the event notification, and data driver 46 may simply store the data in local data cube 34.

Warehouse interface 42 acts as an intermediary between data warehouses 14 and dashboard device 16A. Warehouse interface 42 transmits and receives data between dashboard device 16A and data warehouses 14. For example, in one embodiment, warehouse interface 42 may be implemented so as to transmit and receive data over TCP/IP. In another example embodiment, warehouse interface 42 may transmit and receive flat files. Warehouse interface 42 may also make a preliminary determination as to which component of dashboard device 16A data should be sent: metadata driver 44, data driver 46, or event handler 48. For example, when warehouse interface 42 receives metadata from data warehouses 14, warehouse interface 42 forwards the data to metadata driver 44, whereas when warehouse interface 42 receives an event notification, warehouse interface 42 forwards the event notification to event handler 48.

FIG. 6 is a flowchart illustrating an example sequence of events for initiating a stream of multidimensional data. First, using dashboard 36 of a dashboard device, for example, dashboard device 16A, a user, such as user 12A, will identify a desired set of data from data warehouses 14. User 12A may request, for example, the total number of sales of all products by location for the current year. User 12A need not necessarily be aware of data warehouses 14 or of any portion of computing environment 10 beyond dashboard 36. After identifying the desired data, user 12A may submit the request to dashboard device 16A via dashboard 36 (60).

In response to the request from user 12A, dashboard engine 38 of dashboard device 16A will determine what data to extract from data warehouses 14 (62). For purposes of this example, it is assumed that no data relevant to the request from user 12A is currently stored in local data cube 34. Therefore, dashboard engine 38 determines that all data relevant to the request from user 12A must be extracted. Using key performance indicators ("KPIs"), however, dashboard engine 38 may reduce the dataset to be extracted. For example, dashboard engine 38 may only extract data regarding actual sales of products and corresponding location for the current year when user 12A requests such data while not necessarily extracting data regarding product inventory or forecasted sales. After determining what data to extract, dashboard engine 38 consecutively enters two data extraction modes: metadata extraction and data extraction.

Dashboard engine 38 may generate a unique identifier to create a logical destination for identifying dashboard device 16A to data warehouses 14. Dashboard engine 38 then signals metadata driver 44 to generate metadata queries in metadata extraction mode and sends the unique identifier to metadata driver 44 along with the signal. In response, metadata driver 44 generates queries to retrieve metadata (64). In one embodiment, metadata driver 44 generates SQL queries. Metadata driver 44 generally queries metadata from two sources on data warehouses 14: transactional data 20 and multidimensional data sources 30. In one embodiment, data warehouses 14 are SAP BW systems, wherein transactional data 20 is stored in operational data store ("ODS") tables. After generating the queries, metadata driver 44 sends the queries and identifier to warehouse interface 42, from which the queries and identifier are sent to dynamic query engine 28.

Upon receiving the query and identifier from dashboard device 16A, dynamic query engine 28 may create a new data table entry which associates the identifier with the query (65). Execution framework 54 of dynamic query engine 28 then extracts metadata from transactional data 20 using either or both of RFC handler 52 and OLAP BAPI 53 (66). Extracting metadata from transactional data 20 is straightforward, as transactional data 20 stores data in standard, transparent database tables. Next, execution framework 54 extracts metadata from multidimensional data sources 30, again using either or both of RFC handler 52 and OLAP BAPI 53 (68). In one embodiment, multidimensional data sources 30 store data in a snowflake schema, which includes one fact table, multiple dimension tables, and several master data tables. Execution framework 54 may extract all relevant metadata from multidimensional data sources 30. Dynamic query engine 28 may then return the metadata from both multidimensional data sources 30 and transactional data 20 to dashboard device 16A (70). In one embodiment, execution framework 54 transmits data to dashboard devices 16 using TCP/IP. In another embodiment, execution framework 54 transmits data using a flat file. Other embodiments may use other suitable methods for transmitting data.

Metadata driver 44 of dashboard device 16A receives the returned metadata first in order to generate data queries from the metadata (72). In one embodiment, metadata driver 44 generates SQL queries from the metadata. However, those skilled in the art will appreciate that the methods described herein may incorporate other querying languages without departing from the principles of the invention. In one embodiment, the schema is a snowflake schema. Metadata driver 44 passes the data queries and metadata to data driver 46.

Data driver 46 prepares local data cube 34 in accordance with the received metadata. That is, data driver 46 may create a data cube framework for local data cube 34 from the metadata into which data can be entered upon receiving the raw data. The data cube framework may be a data storage schema corresponding to the storage schema of multidimensional data sources 30. In one embodiment, for example, data driver 46 may recreate the snowflake schema of multidimensional data sources 30. Data driver 46 may then submit the data queries to dynamic query engine 28 of data warehouses 14 in order to retrieve the raw data in the form of a data stream (74). Execution framework 54 of dynamic query engine 28 may associate the queries with the requesting dashboard device in a table and periodically execute the queries, transmitting the results on the wire to the requesting dashboard device, e.g. dashboard device 16A (76).

In one embodiment, dynamic query engine 28 utilizes Java Database Connectivity ("JDBC") to extract data from transactional data 20 and multidimensional data sources 30. In this embodiment, JDBC simply executes the stored SQL queries in the form as they were received from data driver 46 of dashboard device 16A and returns the result to dashboard device 16A (78).

In another embodiment, dynamic query engine 28 utilizes the SAP application layer access. FIG. 5 represents this exemplary embodiment. In this exemplary embodiment, query translator 50 first receives the SQL queries from dashboard device 16A. Query translator 50 parses and translates each query into an OpenSQL query. Once query translator 50 has translated the SQL queries from dashboard device 16A into OpenSQL queries, query translator 50 passes the OpenSQL queries to execution framework 54. Execution framework 54 stores the OpenSQL queries in data table 56. Execution framework 54 periodically executes the stored queries to query transactional data 20 and multidimensional data sources 30 using RFC handler 52. SAP BW provides an RFC library by which other programs may interact with functions implemented in SAP BW. Dynamic query engine 28 may utilize the RFC library to interact with data and functions stored in data warehouses 14.

Execution framework 54 then returns the final resulting dataset to dashboard device 16A (78). Execution framework 54 may send either sequential "chunks" of data or one flat file to dashboard device 16A. Execution framework 54 may use either the chunking method or the flat file method for transmitting updates to the dataset to perform streaming. By sending data using a chunking protocol, execution framework 54 may transmit a potentially infinite stream of data to dashboard device 16A.

Upon receiving the result dataset, data driver 46 may store the result dataset in local data cube 34 (80). Data driver 46 may then perform multidimensional queries on the data stored in local data cube 34 (82), rather than performing multidimensional queries on multidimensional data sources 30 stored in data warehouses 14. In one embodiment, data driver 46 uses MDX to query the data stored in local data cube 34. In another embodiment, data driver 46 uses OLAP BAPIs to query the data stored in local data cube 34. In yet another embodiment, data driver 46 uses a hybrid multidimensional querying language to query the data stored in local data cube 34. In other words, dashboard device 16A may perform multidimensional queries on the data from data warehouses 14 without using Open Analysis Interfaces 26 of data warehouses 14 by performing multidimensional querying on local data cube 34. Specifically, dashboard device 16A may perform multidimensional queries on the data without utilizing the MDX processors of data warehouses 14.

Upon completion of the query of local data cube 34, dashboard engine 38 may update dashboard 36 to display the result to the user (83). A method for initiating a view for a streaming database system is discussed in greater detail in co-pending U.S. patent application Ser. No. 10/750,507, Weipeng P. Yan et al., "A Method and System for Dynamically Initializing a View for a Streaming Data Base System," filed Dec. 31, 2003, assigned to the assignee of the present invention, which is hereby incorporated by reference in its entirety.

Figure 7:
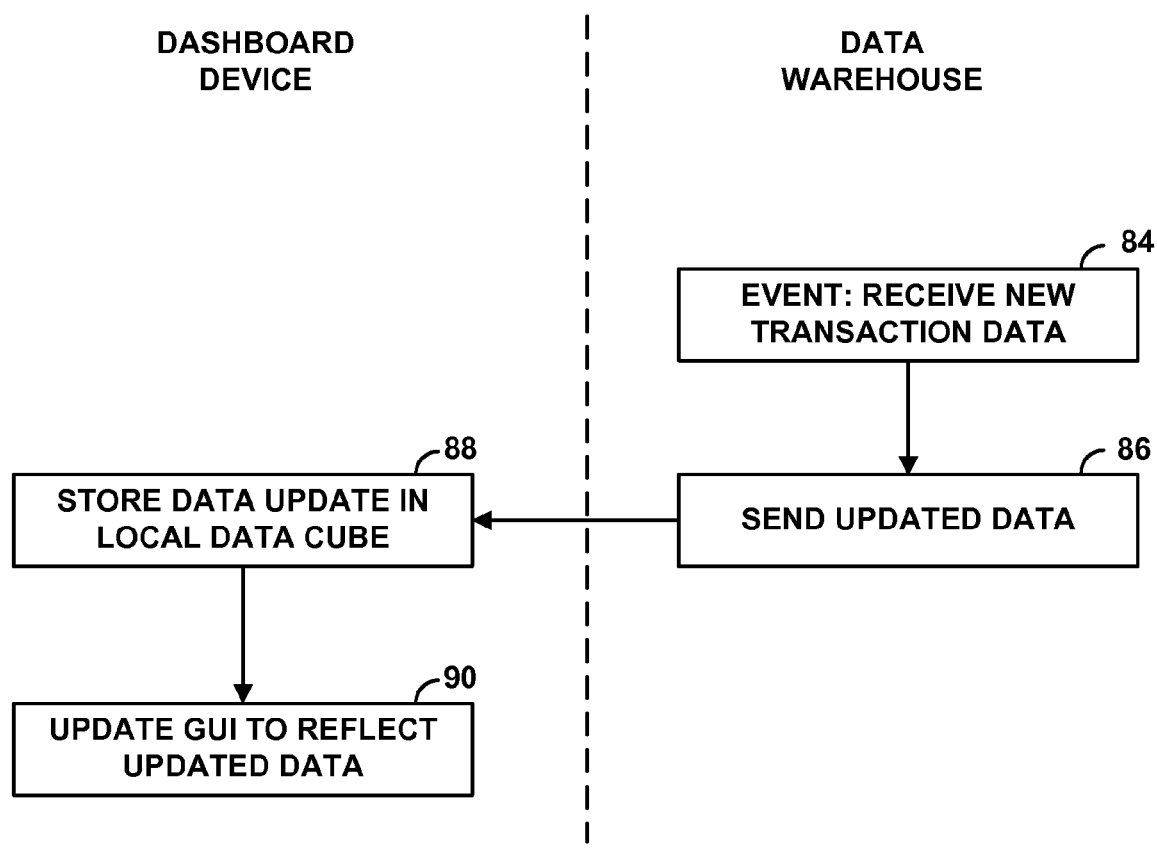
FIG. 7 is a flow chart illustrating an example sequence of events for streaming updates to the data.

FIG. 7 is a flowchart illustrating an example sequence of events for streaming updates to the data. As described above, a transaction event may be any event which updates transaction data source 20, for example, a sale of a product. Dynamic query engine 28 may be able to respond to such transaction events. When a new event occurs, dynamic query engine 28 may issue an event trigger to appropriate dashboard devices 16. This may permit streaming of data such that users 12 accessing dashboard devices 16 may view changes to the data stored in data warehouses 14 in real time. First, a transaction event occurs which changes the data stored in transaction data store 20 (84). Dynamic query engine 28 detects this event. Using the query and destination ID first received query a dashboard device, for example, dashboard device 16A, execution framework 54 extracts the new transaction data and sends the new data to dashboard device 16A (86). Data driver 46 receives the new data and may store the data appropriately in local data cube 34 (88). Data driver 46 may also inform dashboard engine 38 of the update. In response, dashboard engine 38 may extract the new data and instruct dashboard 36 to update the associated display. By only extracting the new data, the system may avoid delays associated with extracting the same data repeatedly and may maintain a large amount of available bandwidth, making streaming of multidimensional data possible. The process for streaming updates in response to an event is discussed in greater detail in co-pending U.S. patent application Ser. No. 10/446,336, Diaz H. Nesamoney et al., "Method for Providing a Real Time View of Heterogeneous Enterprise Data," filed May 27, 2003, and Ser. No. 10/446,338, Diaz H. Nesamoney et al., "Method for Performing Real-Time Analytics Using a Business Rules Engine on Real time Heterogeneous Materialized Data Views," filed May 27, 2003, each assigned to the assignee of the present invention, which are hereby incorporated by reference in their entirety.

Figure 8:
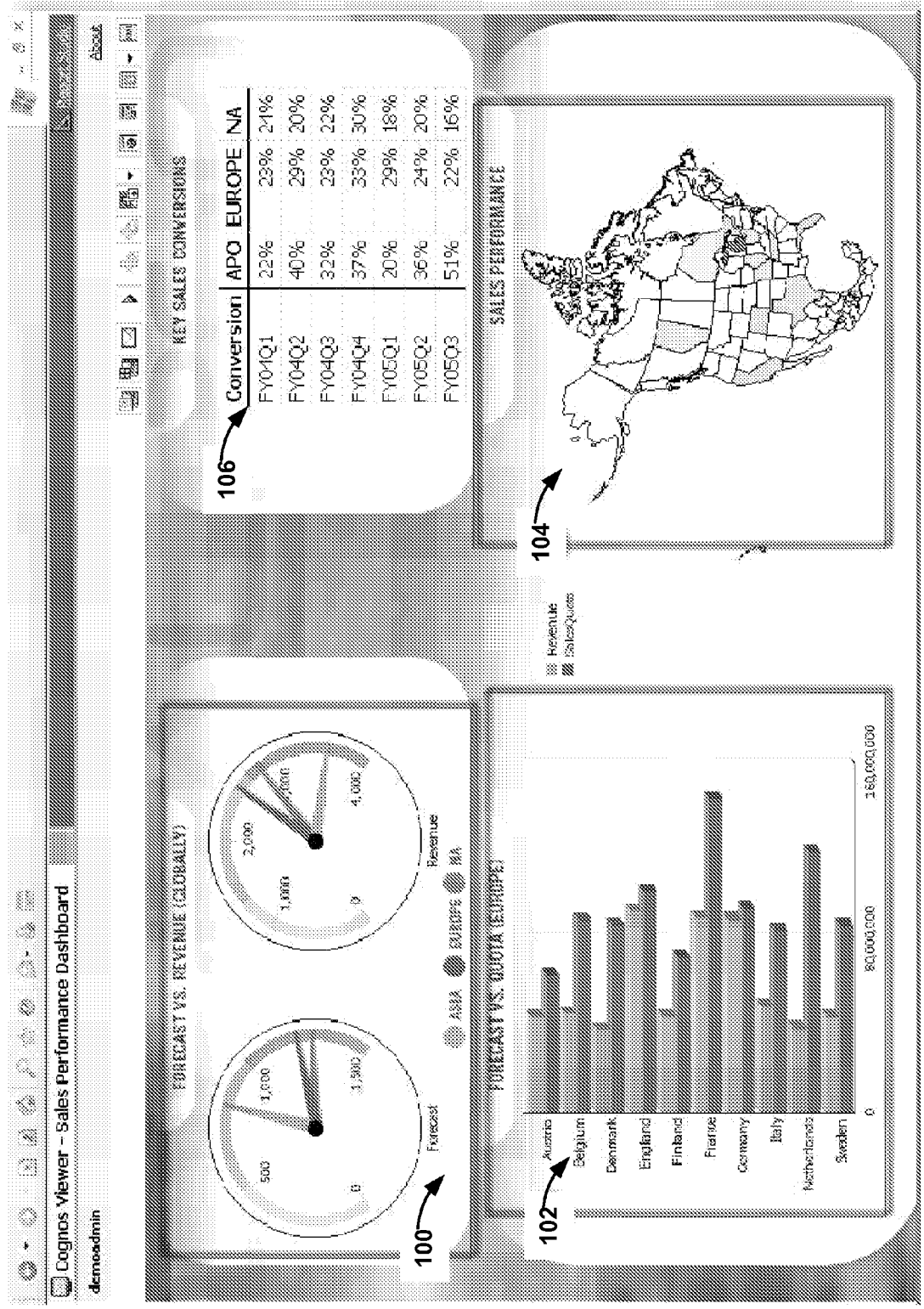
FIG. 8 is a block diagram illustrating an example screenshot of a graphical user interface ("GUI") presented by a dashboard device.

FIG. 8 is a block diagram illustrating an example screenshot of a dashboard, which is a type of graphical user interface ("GUI"). The dashboard portrayed in FIG. 8 is one example embodiment of dashboard 36 on dashboard device 16A. Dashboard 36 provides a plurality of data views to users 12 which show views of data stored on data warehouses 14 and changes to the data in real time. A user, such as user 12A, may define multiple views. A corresponding dashboard is displayed to a user, such as user 12A, upon the user login. In the example, dashboard 36 presents four windows to a user, for example, user 12A. The example dashboard of FIG. 8 generally displays sales performance figures. Window 100 is a speedometer-like at-a-glance display. Window 100 compares the forecasted revenue and actual revenue of several different regions, namely Asia, Europe, and North America ("NA"). As transaction events occur, causing the data to change, user 12A may observe the "needles" of window 100 respond in real time. To create window 100, dashboard device 16A may issue a query which retrieves forecasted and actual revenue by region and filters out all areas except Asia, Europe, and North America.

Window 102 is a detailed forecast vs. quota revenue chart of various regions in Europe. Again, user 12A may observe changes to the data in real time. Likewise, dashboard device 16A may issue a query retrieving forecast and quota figures by regions within Europe. Similarly, window 106 displays key sales conversion by quarter and region.

Window 104 permits user 12A to select various regions within North America. If user 12A is interested in obtaining greater detail than merely North America, user 12A may utilize interactive maps such as window 104 to highlight specific regions. Dashboard device 16A retrieves the highlighted regions in order to form queries to issue to data warehouses 14.

Various embodiments of the invention have been described. These and other embodiments are within the scope of the following claims.

The invention claimed is:

1. A data warehouse comprising:
   a multidimensional data storage area comprising a multidimensional data cube, the multidimensional data cube comprising a data storage schema that defines a structure of the multidimensional data cube and multidimensional data arranged according to the data storage schema;
   a transactional data storage area to store underlying transactional data from which the multidimensional data of the multidimensional data cube are generated;
   a computer-readable storage medium comprising instructions for a multidimensional query processor and a dynamic query engine;
   one or more processors that execute the multidimensional query processor to provide one or more interfaces to issue a first set of queries conforming to one or more multidimensional query languages to retrieve metadata defining the data storage schema that defines the structure of the multidimensional data cube, without retrieving the multidimensional data of the multidimensional data cube; and that execute the dynamic query engine to provide an additional interface to issue a second set of queries that bypass the interfaces provided by the multidimensional query processor and the multidimensional data storage area to retrieve the transactional data directly from the transactional data storage area, wherein the second set of queries do not conform to any of the one or more multidimensional query languages, and wherein the second set of queries are defined to retrieve the transactional data from which the multidimensional data of the multidimensional data cube are generated, wherein the transactional data comprises enterprise data representing enterprise activities; and
   a gateway server to transmit the results of the second set of queries through a network, wherein the gateway server transmits the results as a real-time stream of events that indicate incremental changes to the transaction data, and wherein the stream of events represents real-time changes to the enterprise data in response to the enterprise activities,
   wherein the data warehouse comprises a data warehouse for an enterprise software system.

2. The data warehouse of claim 1, wherein the gateway server implements a chunking protocol to transmit the results of the second set of queries as a series of discrete chunks of data.

3. The data warehouse of claim 2, wherein the gateway server implements the chunking protocol as an application layer (layer seven) application of the Open Systems Interconnection ("OSI") networking model.

4. The data warehouse of claim 1, further comprising a data table, wherein the data table includes a first column to store identifiers of network devices and a second column to store queries associated with the identifiers of the network devices.

5. The data warehouse of claim 1, wherein the additional interface provided by the dynamic query engine is a Structured Query Language ("SQL") interface.

6. The data warehouse of claim 5, wherein the dynamic query engine includes a query translator to translate SQL queries into OpenSQL queries.

7. The data warehouse of claim 1, wherein the data warehouse comprises the SAP Business Information Warehouse.

8. The data warehouse of claim 7, wherein the multidimensional query processor comprises a Multidimensional Expressions ("MDX") processor.

9. The data warehouse of claim 7, wherein the multidimensional query processor comprises an SAP Business Explorer ("BEX") processor.

10. A method comprising:
    installing a dynamic query engine on a data warehouse, wherein the data warehouse includes transactional data in a transactional data storage area and a multidimensional data cube comprising multidimensional data generated from the transactional data in a multidimensional data storage area, wherein the multidimensional data cube comprises a data storage schema that defines a structure of the multidimensional data cube, wherein the multidimensional data of the multidimensional data cube is arranged according to the data storage schema, wherein the transactional data storage area comprises transactional data from which the multidimensional data of the multidimensional data cube are generated, and further wherein the data warehouse includes a multidimensional query processor that provides one or more interfaces for issuing a first set of queries conforming to the one or more multidimensional query languages to retrieve metadata defining the data storage schema that defines the structure of the multidimensional data cube, without retrieving the multidimensional data of the multidimensional data cube, and wherein the data warehouse comprises a data warehouse for an enterprise software system;
    providing, with the dynamic query engine, an additional interface that issues a second set of queries that bypass the interfaces provided by the multidimensional query processor and the multidimensional data storage area, wherein the second set of queries do not conform to any of the one or more multidimensional query languages, and wherein the second set of queries are defined to retrieve the transactional data from which the multidimensional data of the multidimensional data cube are generated, wherein the transactional data comprises enterprise data representing enterprise activities;
    retrieving, with the one or more interfaces of the multidimensional query processor, the metadata defining the data storage schema that defines the structure of the multidimensional data cube from the multidimensional data storage area without retrieving the multidimensional data from the multidimensional data storage area;
    retrieving, with the additional interface of the dynamic query engine, the transactional data, from which the multidimensional data of the multidimensional data cube are generated, directly from the transactional data storage area according to the second set of queries; and
    streaming the retrieved transactional data on a network via a gateway server, wherein the gateway server streams the retrieved transactional data as a real-time stream of events that indicate incremental changes to the transactional data, and wherein the stream of events represents real-time changes to the enterprise data in response to the enterprise activities.

11. The method of claim 10, wherein streaming includes transmitting, with a gateway server operating at an application layer (layer seven) of the Open Systems Interconnection ("OSI") networking model, the results of the second set of queries through the network.

12. The method of claim 11, wherein transmitting comprises:
    separating the results of the second set of queries into a plurality of chunks of application layer data; and
    sending each of the chunks individually through the network according to a chunking protocol.

13. The method of claim 11, wherein transmitting comprises transmitting according to the transmission control protocol/internet protocol ("TCP/IP").

14. The method of claim 10, further comprising storing, in a data table, the second set of queries and an identifier which identifies a recipient of the results of the second set of queries.

15. The method of claim 10, wherein providing an additional interface comprises providing a Structured Query Language ("SQL") interface.

16. The method of claim 15, further comprising:
    receiving SQL queries, wherein the SQL queries are the second set of queries; and
    translating the SQL queries into OpenSQL queries.

17. A system comprising:
    a data warehouse comprising a data warehouse for an enterprise software system, the data warehouse comprising:
        a multidimensional data storage area comprising a multidimensional data cube comprising a data storage schema that defines a structure of the multidimensional data cube, the multidimensional data storage area further comprising multidimensional data arranged according to the data storage schema,
        a transactional data storage area to store underlying transactional data from which the multidimensional data of the multidimensional data cube are generated,
        a multidimensional query processor to provide one or more interfaces to issue a first set of queries conforming to one or more multidimensional query languages to retrieve metadata defining the data storage schema that defines the structure of the multidimensional data cube, without retrieving the multidimensional data of the multidimensional data cube; and
        a dynamic query engine to provide an additional interface to issue a second set of queries that bypass the interfaces provided by the multidimensional query processor and the multidimensional data storage area to retrieve the transactional data directly from the transactional data storage area and metadata from the multidimensional data storage area, wherein the second set of queries do not conform to any of the one or more multidimensional query languages, and wherein the second set of queries are defined to retrieve the transactional data from which the multidimensional data of the multidimensional data cube are generated, wherein the transactional data comprises enterprise data representing enterprise activities; and
    a network device comprising a dashboard device, the network device comprising:

a streaming database having a local multidimensional data storage area, a metadata driver to receive metadata from the dynamic query engine of the data warehouse, and a data driver to create a local storage schema in the local multidimensional data storage area according to the metadata received from the dynamic query engine such that the local storage schema corresponds to the storage schema of the multidimensional data cube of the data warehouse, to generate the second set of queries for the dynamic query engine, to receive transactional data from the dynamic query engine, and to store the received transactional data in the local multidimensional storage area according to the storage schema, wherein the dynamic query engine of the data warehouse transmits, to the dashboard device, results of the second set of queries associated with the dashboard device as a real-time stream of events that indicate incremental, real-time changes to the enterprise data in response to the enterprise activities.

18. The system of claim 17, wherein the local storage schema of the local multidimensional data storage area of the network device comprises a snowflake schema.

19. The system of claim 17, wherein the dashboard device includes a graphical user interface ("GUI") module to provide a dashboard to one or more users and to receive requests for particular views of the transactional data of the data warehouse from the one or more users.

20. The system of claim 19, wherein the data driver generates the second set of queries in accordance with the requests from the one or more users.

21. The system of claim 17, wherein the data warehouse comprises an SAP® Business Information Warehouse ("SAP BW").

22. The system of claim 21, wherein the multidimensional query processor comprises a Multidimensional Expressions ("MDX") processor.

23. The system of claim 17, wherein the additional interface provided by the dynamic query engine is a Structured Query Language ("SQL") interface.

24. A computer-readable storage medium comprising instructions for causing a programmable processor to:

receive, from a dashboard device, a unique identifier and a set of queries, wherein the queries do not conform to a multidimensional data query language;

store the unique identifier and the set of queries in a data table;

retrieve metadata from a multidimensional data storage area of a data warehouse, wherein the metadata defines a data storage schema of a multidimensional data cube of the multidimensional data storage area, and wherein the instructions that cause the processor to retrieve the metadata from the multidimensional data storage area cause the processor to retrieve the metadata without retrieving multidimensional data of the multidimensional data cube from the multidimensional data storage area, and wherein the multidimensional data of the multidimensional data storage area are generated from transactional data of a transactional data storage area of the data warehouse, and wherein the data warehouse comprises a data warehouse for an enterprise software system;

transmit the metadata from the multidimensional data storage area to the dashboard device via a gateway server using a chunking protocol operating at an application layer (layer seven) of the Open Systems Interconnection ("OSI") networking model, wherein the gateway server streams the retrieved transactional data as a real-time stream of events that indicate incremental changes to the transactional data, and wherein the stream of events represents real-time changes to the enterprise data in response to the enterprise activities;

retrieve, by bypassing the multidimensional data storage area, transactional data directly from the transactional data storage area of the data warehouse, wherein the retrieved transactional data comprises transactional data from which the multidimensional data of the multidimensional data cube are generated, wherein the transactional data comprises enterprise data representing enterprise activities; and transmit the retrieved transactional data to the dashboard device using the chunking protocol.

* * * * *